(12) United States Patent
Fu et al.

(10) Patent No.: US 7,058,937 B2
(45) Date of Patent: Jun. 6, 2006

(54) METHODS AND SYSTEMS FOR INTEGRATED SCHEDULING AND RESOURCE MANAGEMENT FOR A COMPILER

(75) Inventors: Chen Fu, Piscataway, NJ (US);
Dong-Yuan Chen, Fremont, CA (US);
Chengyong Wu, Beijing (CN);
Dz-Ching Ju, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 621 days.

(21) Appl. No.: 10/121,763

(22) Filed: Apr. 12, 2002

(65) Prior Publication Data

US 2003/0196197 A1    Oct. 16, 2003

(51) Int. Cl.
*G06F 9/45*    (2006.01)
(52) U.S. Cl. ...................................... 717/161
(58) Field of Classification Search ......... 717/136–161
See application file for complete search history.

(56) References Cited

U.S. PATENT DOCUMENTS 5,764,951 A * 6/1998 Ly et al. .................. 716/1
6,260,190 B1 * 7/2001 Ju ............................... 717/156
6,499,090 B1 * 12/2002 Hill et al. ................... 711/158
6,675,380 B1 * 1/2004 McKinsey et al. .......... 717/161

OTHER PUBLICATIONS

Faraboschi, et al., (Faraboschi), "Instruction Scheduling for Instruction Level Parallel Processors", Proceedings of the IEEE, vol. 89, No. 11, Nov. 2001, pp. 1638-1659.*
Kastner, et al., ILP-based Instruction Scheduling for IA-64, 2001, ACM, pp. 1-10.*

* cited by examiner

*Primary Examiner*—Tuan Dam
*Assistant Examiner*—Andre R. Fowlkes
(74) *Attorney, Agent, or Firm*—Fish & Richardson P.C.

(57) ABSTRACT

A compiler comprising an integrated instruction scheduler and resource management system is provided. According to an aspect of an embodiment, the resource management system includes a function unit based finite state automata system. Instructions to be compiled are modeled through the function unit based finite state automata system based on their function unit usage, before they are emitted as compiled computer code. We also disclose a function unit based finite state automata data structure and computer implemented methods for making the same.

29 Claims, 10 Drawing Sheets

MICRO-LEVEL SCHEDULER

METHODS AND SYSTEMS FOR INTEGRATED SCHEDULING AND RESOURCE MANAGEMENT FOR A COMPILER

BACKGROUND

1. Field of the Invention

The invention pertains to the field of computer program compiler design, and in particular hardware resource management and optimization.

2. Background Information

Many modern microprocessors are designed to allow a high degree of instruction level parallelism, meaning that at any given time more than one instruction can be executing concurrently. The extent to which a microprocessor achieves a high degree of parallelism is not strictly attributed to more complex microprocessor designs, or necessarily even more resources in the microprocessor architecture (although both are factors). Rather, the full potential of the instruction level parallelism can be achieved only through management of the available hardware resources within the microprocessor.

Computer programs, such as application programs, like Microsoft Word (™), are often written in high-level languages, such as C, C++, and BASIC variants. Because computer programs are written in high-level languages, they are easy for a computer programmer to read and understand. More importantly, programs written in high-level languages are easy to change.

Almost all high-level language and most lower language programs must be compiled before they are executed (although some BASIC programs are interpreted—meaning they are not first compiled—but even some of these have engines that must be first compiled so the interpretation can take place). This function is performed by a compiler.

Most compilers translate source code into assembly language instructions ("assembly"), and the assembly language is again broken down by an assembler into a series, or sequence, of binary instructions that are executed by the microprocessor. These instructions are called machine operations. The machine operations are represented by operation codes (also called "op codes"), which are the mnemonic in an operation and the associated operands. Often, the term "compiler" refers to a unit that handles compilation of source code into assembly language instructions, and assembly language instructions into machine operations.

One of the reasons many programs are compiled is because computer programmers try to achieve "code reuse", which is the ability of source code to be reused in different microprocessors. Because the microcode and acceptable machine operations for different microprocessors vary widely, compilers are often tailored for particular microprocessors. As a consequence, the compilers themselves can vary widely. Some compilers are basically translation units that simply transform source code coming in into machine operations headed out, while others include scheduling and resource management tasks.

As microprocessors become more sophisticated and high-level programming is more common, the need for smarter compilers grows. As is mentioned above, many modern microprocessors can execute instructions in parallel. Compilers leverage this feature by attempting to increase the instruction level parallelism.

A compiler technique to exploit parallelism is instruction scheduling (or just "scheduling"). Scheduling involves ordering instructions for a microprocessor architecture (e.g., pipelined, superscalar, or very long instruction word ("VLIW")). This ordering is so that the number of function units executing at any given time is maximized and so that intra- or inter-cycle wait time for resource availability is minimized. Some scheduling techniques include filling a delay slot, interspersing floating point instructions with integer instructions, and making adjacent instructions independent.

Another technique to exploit parallelism is resource management. Resource management typically involves re-organizing the instructions scheduled with an instruction scheduler according to resource availability.

FIG. 1A schematically represents how most optimizing compilers work. High-level language instructions 6 are passed into a compiler 8, which schedules and compiles the high-level language instructions 6, with the aid of an instruction scheduler 10, and a separately executed resource management module 12. The compiled instructions 14 (i.e., machine operations) are then passed along to the microprocessor 16. At the microprocessor 16, the instructions 14 are streamed in for execution and are first intercepted by issue and decoding logic 18. The issue logic 18 decodes each instruction to determine where to pass each of the compiled instructions 14—issuing each instruction to a pipeline 20 associated with a particular function unit 22, 24, 26.

In approximately 1999, Intel Corporation introduced aspects of the Itanium (™) Processor Family ("IPF") architecture, which corresponds to a family of parallel microprocessors. The first generation of IPF processor is called Itanium (™) and is a "6-wide" processor, meaning it can handle up to six instructions in parallel in a cycle. The 6-wide instructions are encoded into two 3-instruction-wide words, each called a "bundle", that facilitates parallel processing of the instructions.

The IPF encodes each bundle by organizing the instructions into pre-selected templates. The IPF provides a number of templates that represent certain general instruction patterns. Instructions are broken down into template "syllables" representing different functions or "instruction types", which are executed by one or more function units, which are in turn classified by function unit ("FU") type. For example, instructions are broken down into syllables corresponding to memory functions (M), integer functions (I), floating point functions (F), branch functions (B), and instructions involving a long immediate (L). The templates are arrangements of these template syllables (that is, the order of instructions slots in a bundle), such as MMI, MII, MMF, etc. (A list of the template types is available from the "IA-64 Application Developer's Architecture Guide", Order Number 245188-001, May 1999, and available from Intel Corporation, in Santa Clara, Calif.)

The specific Itanium processor function unit to which an instruction is sent is determined by its instruction's template syllable type and its position within the current set of instructions being issued. The process of sending instruction to functional units is called "dispersal". The Itanium processor hardware makes no attempt to reorder instructions to avoid stalls or a split issue. Thus, if code optimization is a priority, then the compiler must be careful about the number, type, and order of instructions inside a bundle to avoid unnecessary stalls.

When more than one function unit of a particular type is included in the microprocessor architecture, as is the case in the Itanium Architecture (™), which has 2 M-units, 2 I-units, 2 F-units, and 3 B-units, modeling the dispersal rules become quite complicated using traditional techniques. FIG. 1B graphically depicts instruction slot to function unit mapping following dispersal rules. (This is further described in the document "Intel Itanium (™) Processor Reference Manual for Software Optimization", Order Number 245473-003, November 2001, and also available from Intel Corporation, which also details the dispersal rules.)

In this paradigm, the compiler 8 is responsible for handling instruction scheduling, as well as instruction bundling and template selection. The microprocessor 16 then dispatches the instructions according to the template selected by the compiler 8. The advantage of this design is simplicity of issue logic 18.

An illustration is in order. For this we turn to TABLES 1 and 2. But first, some notes are in order on TABLE 1. First, the instructions are numbered, which is only the purpose of this description. Second, a stop code ";;" or "stop bit" is added to the assembly language to inform the hardware (microprocessor) of a cycle break. Third, assume that a microprocessor has two memory (M) execution units and two ALU (I) units available. Fourth, assume that a microprocessor can execute one bundle of instructions per cycle. Finally, assume that there are only two templates available MMI and MII.

A traditional instruction scheduler in a typical compiler often uses dependence critical path length as the primary cost function to schedule instructions. The instruction bundling and template selection are handled by a post-scheduling bundling module. Consequently, a traditional instruction scheduler may derive a two-cycle schedule as shown in Table 1, with instructions 1 (M), 2 (I), and 3 (M) in the first cycle and instructions 4 (M), 5 (I), and 6 (I) in the second cycle.

TABLE 1

| 1 | ld a = [x]      |
|---|-----------------|
| 2 | add b = y, e    |
| 3 | ld y = [f];;    |
| 4 | ld c = [g]      |
| 5 | add x = h, i    |
| 6 | add d = j, k;;  |

The post-scheduling bundling module in the compiler then tries to encode the instructions in TABLE 1 into IPF instruction bundles with templates. However, when the instructions in TABLE 1 are processed by the bundling module, no "MIM" template can be found for the first cycle. The bundling module may try to re-order the instructions into an "MMI" template (so instructions 1, 3, 2), but this is not possible due to an anti-dependency (write-after-read dependency) on y with respect to instructions 2 and 3.

Thus, when the bundling module attempts to bundle the instructions into a valid template, instruction 3 is forced into a new cycle. The templates end up looking like: MII (1, 2, nop), MII (or Mxx, where xx represent valid assignments) (3, nop, nop), and MII (4, 5, 6). A cycle is wasted and 3 "nop" (no operation) instructions are issued. The resulting instructions are shown in TABLE 2:

TABLE 2

| {mii: | ld a = [x]       |
|-------|------------------|
|       | add b = y, e     |
|       | nop ;;}          |
| {mii: | ld y = [f]       |
|       | nop              |
|       | nop ;;}          |
| {mii: | ld c = [g]       |
|       | add x = h, i     |
|       | add d = j, k ;;} |

Finite state automata techniques have been proposed for resource management. For instance, T. A. Proebsting and C. W. Fraser, in "Detecting Pipeline Structural Hazards Quickly," *Proc. of the 21$^{st}$ Annual ACM Symposium on Principles of Programming Languages*, pp. 280–286, January 1994, proposes that a 2D lookup table be implemented to model resource contention in execution pipelines. A drawback to the Proebsting et al. approach is the large size of the lookup table, which has an upper bound of s×i bytes, where s is the number of states and i is the number of instruction classes (so over 86,450 two-byte entries in a system with 6175 states and 14 instruction classes). This, we note, was an improvement over a prior approach, which was a 3D lookup table requiring s×i×c bytes, where c is the cycle count (so over 3.1 million two-byte entries in a system with 37 cycles).

Also exemplary of the state of the art is V. Bala and N. Rubin, "Efficient Instruction Scheduling Using Finite State Automata," *Proc. of the 28$^{th}$ Annual International Symposium on Microarchitecture*, pp. 46–56, November 1995, which further describes the problem of past solutions and an improvement over the Proebsting et al. approach, but still using the same basic framework.

BRIEF DESCRIPTION OF THE DRAWINGS

FIG. 8A depicts a dependence graph and latencies for instructions fed into a compiler. FIG. 8B traces through a typical integrated scheduling and resource management cycle 850 to output a final bundle template.

DETAILED DESCRIPTION OF THE PREFERRED EMBODIMENTS

We describe an integrated or "coupled" instruction scheduler and resource management system. According to an aspect of an embodiment, the resource management system includes a function unit ("FU") based finite state automata system. In one embodiment, we incorporate template restrictions and dispersal rules as part of the resource management, and further we integrate instruction template assignment and instruction bundling as part of resource management. We also disclose a function unit based finite state automata data structure and computer implemented methods for making, and transitioning in the same.

The systems, techniques, and computer implemented methods and structures described below are set forth in sections to aid in understanding the individual systems and methods. While single systems or techniques may be understood in their entirety in their respective sections, it is helpful to review all sections so that a better understanding of our preferred embodiments can be achieved, as well to aid in understanding how all of the systems and techniques individually and collectively contribute to improved compiler design and resource management.

To further aid in understanding, exemplary pseudo-code is provided for a number of the computer implemented methods and techniques described herein. As with the accompanying figures, the pseudo-code is desired to be representative of embodiments of the systems and techniques we have invented, and not the only embodiments for a computer program realizing theses systems and techniques.

Operational Overview

Figure 1A:
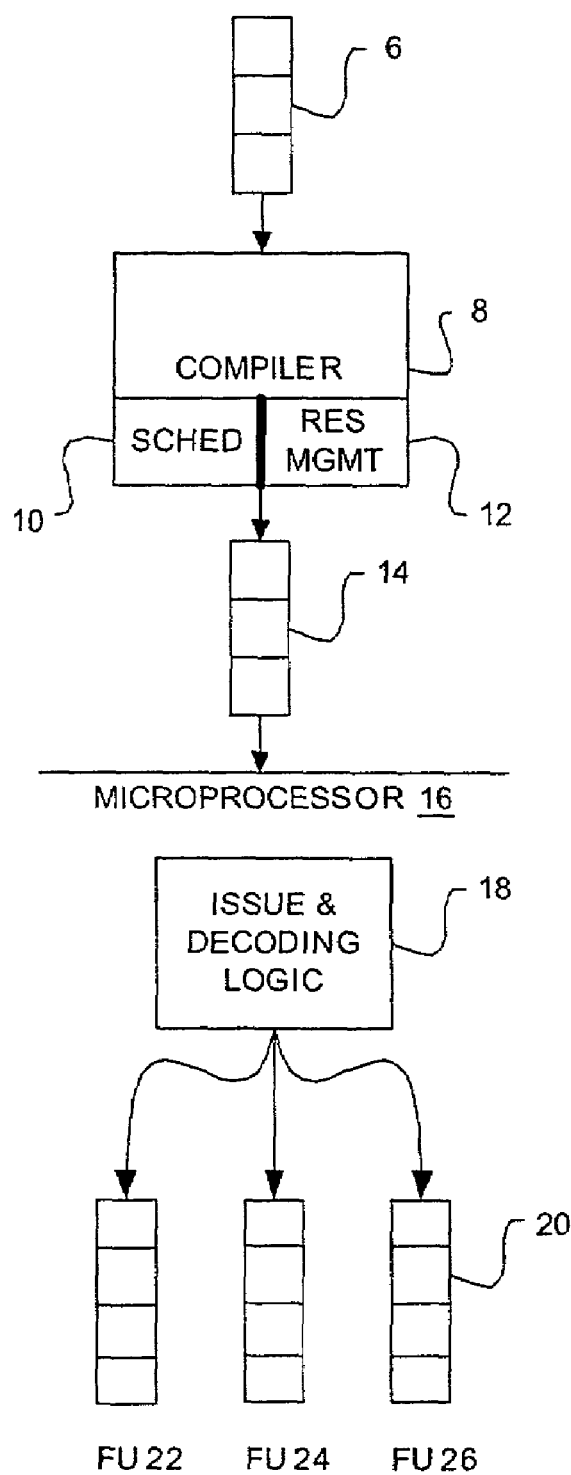
FIG. 1A depicts the operation of a prior scheduling and resource management system.
Figure 1B:
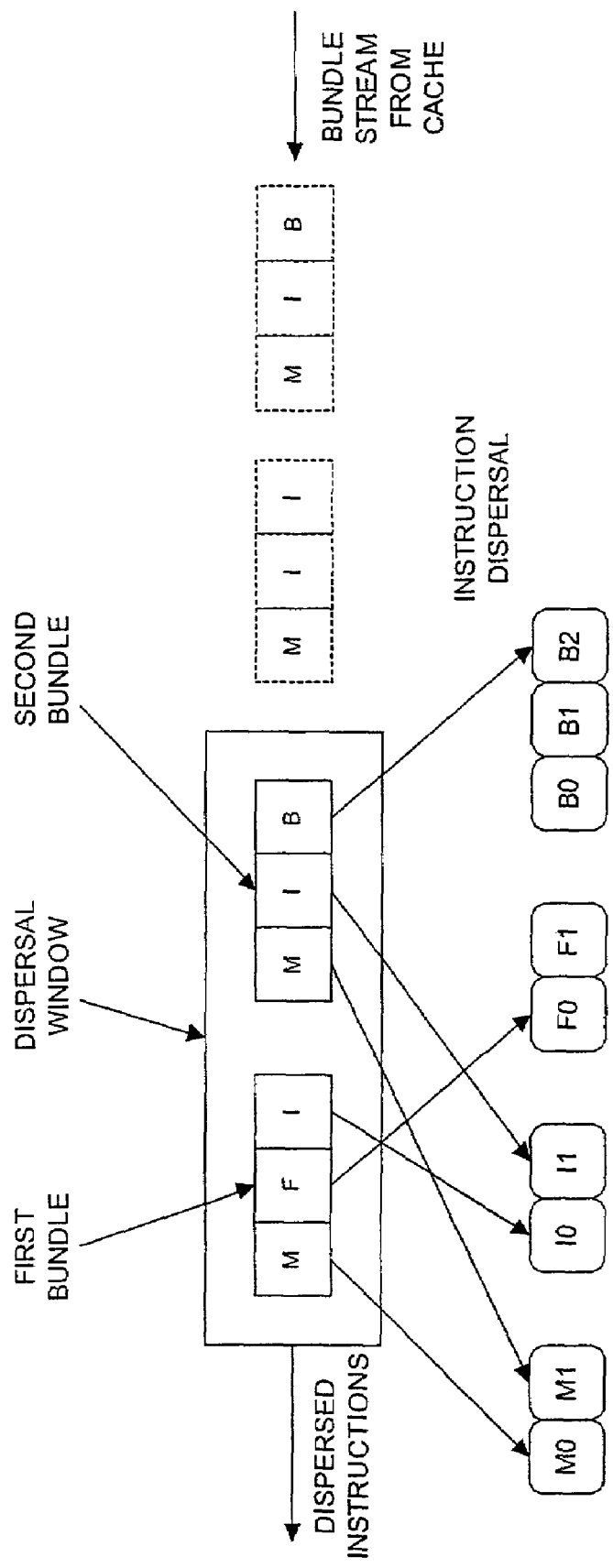
FIG. 1B depicts instruction slot to functional unit mapping.
Figure 2:
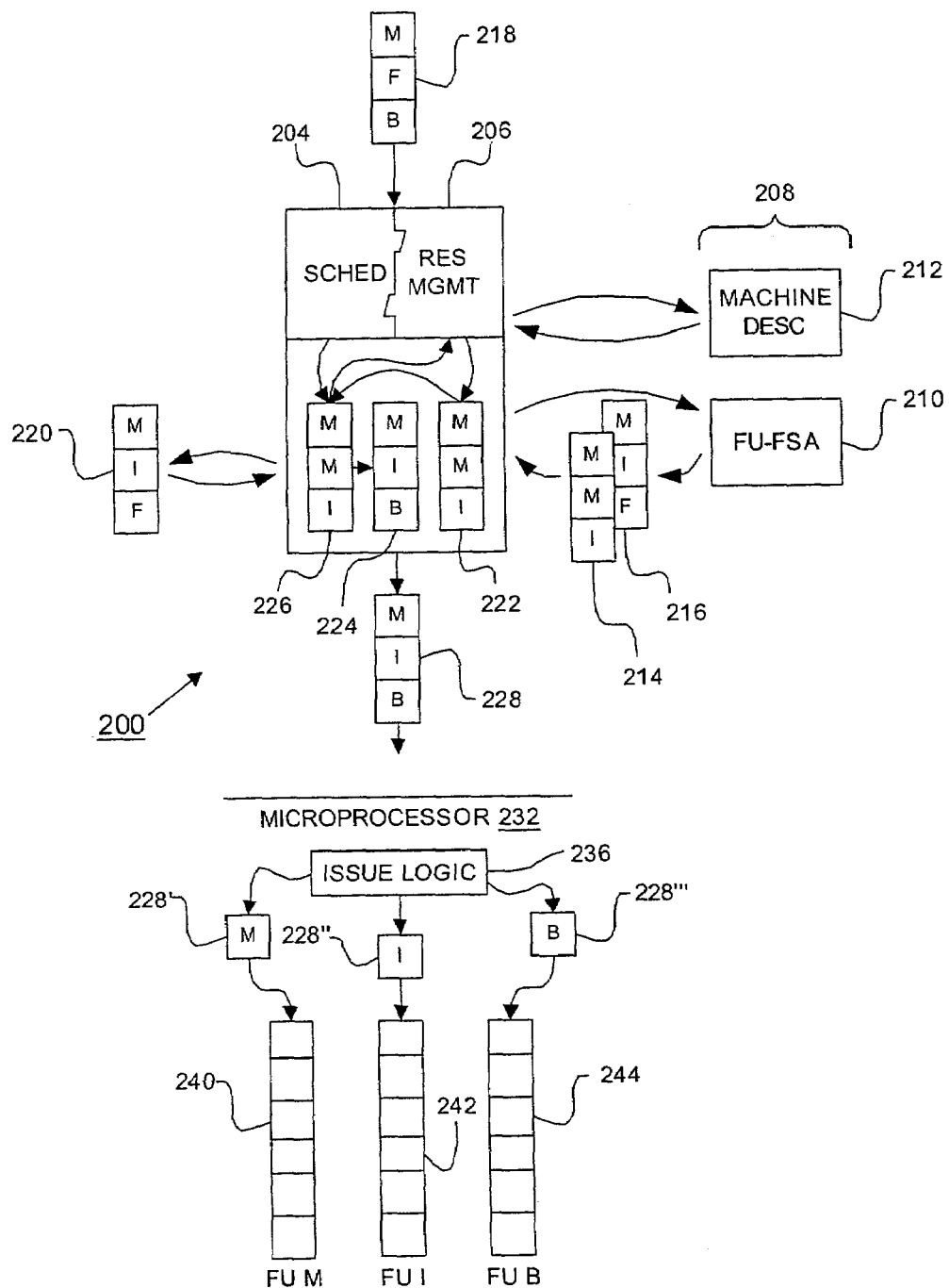
FIG. 2 is a data flow diagram of a coupled instruction scheduler and resource management.

FIG. 2 depicts an embodiment of a compiler 200 with integrated scheduling and resource management. The compiler 200 includes a scheduling module 204 and a resource management module 206. Also shown are data structures 208, which can be persistently stored in a computer readable memory that is addressable while the compiler is executing. Shown here are two data structures: one is a function-unit based finite state automata table ("FU-FSA") 210, the other is a machine description file 212.

The FU-FSA 210 is configured to store sequences of function unit usage patterns that result from one or more valid bundle templates for execution in one machine cycle of a microprocessor. According to one embodiment, the FU-FSA 210 stores a sequence of bit vectors (hereinafter "FU vectors") representing all of the function unit combinations for the microprocessor. For each FU vector, a table (or a pointer to a table) is stored that holds data indicative of pre-built, valid function unit template assignments (e.g., 214 and 216) for the FU vectors.

The machine description file 212 is configured to store microprocessor resource management information including machine width, registers, function units, and template information. Additional information can also be stored in the machine description file 212, such as scheduling information—including instruction latency, pipeline bypass constraints, and can further include dispersal rules, or pre-built template assignments that can account for the dispersal rules.

A typical data flow through the compiler 200 is as follows: Instructions 218 are received at the compiler 200. The compiler can maintain a number of temporary memory buffers for storing instructions as they are received and manipulated. According to one embodiment, the compiler 200 maintains three memory buffers for handling manipulated instructions. Namely, a previous cycle buffer 224, a current cycle buffer 226, and a temporary (or "scratch") cycle buffer 222. The previous cycle buffer 224 and the current cycle buffer 226 can be manipulated by both the instruction scheduling module 204 and the resource management module 206, while the temporary cycle buffer 222 can be used by the resource management module 206 to temporarily reorganize and test instruction ordering within a cycle from one or more of the other cycle buffers.

As the instructions are received at the compiler 200, they can be placed into groups. For instance they can be explicitly placed according to a compiler directive in the instructions 218, or they can be simply placed into groups according to the order in which they are received, or they can be placed into groups by the instruction scheduler 204.

According to one embodiment, the instructions 218 are placed into a candidate list 220 as they are received. The candidate list 220 is a temporary data structure that holds instructions that, according to one embodiment, have not been scheduled. (Note that as shown in FIG. 2, the candidate list 220 and other memory structures are shown not with instructions in them, but the function unit (or "issue port") to which the particular instruction corresponds.)

High-level instruction scheduling is performed by the instruction scheduling module 204, for instance by accessing the machine description file 212 and pulling instructions, for example one at a time, from the candidate list 220. In this phase, instructions are placed into the current cycle buffer 226. Dependency constraints can be specified at this time.

Next, a micro-level instruction scheduling is performed by the resource management module 208. Here, the resource management module 208 can access the FU-FSA 210 to identify pre-built, valid template assignments (214 and 216) corresponding to the function unit usage of the instructions in the current cycle buffer 222. The resource management module 208 can re-arrange the instructions within the temporary cycle buffer 222 so that they match a valid, legal template 214 for the microprocessor 232. If no valid or legal template can be found, then another instruction can be pulled from the candidate list 220 and the process can repeat. We note that the high-level and micro-level scheduling are integrated, meaning that either scheduler is not necessarily finished with all of the instructions before the other (e.g., the micro-level instruction scheduler) has begun to operate. In other words, the two schedulers alternate to work on each instruction.

According to one embodiment, the current cycle buffer 226 can be immediately finalized (or "committed"). Alternatively, it can be temporarily stored in another buffer to achieve a one or more cycle delay before commitment. Employing this multi-cycle buffering technique, we can advance to a next cycle, create another representation for the current cycle buffer 226, and perform high-level and micro-level scheduling for more than one cycle at a time. We can achieve better optimization of templates this way—by maintaining a one or more cycle delay with a multiple schedule-cycle buffers. To this end, the previous cycle buffer 224 is provided to store the contents of the current cycle buffer 226 when advancing to a next cycle. In a like manner, more than one previous cycle buffers can be provided to achieve a longer "window" in which to optimize the integrated instruction scheduling and resource management techniques.

When ready, the compiler 200 outputs a committed set of instructions 228 that are then passed on to the microprocessor 232. When the microprocessor 232 receives the instructions 228, they can be immediately routed by issue logic 236 to an appropriate pipeline (240, 242, 244) without the need for complex decoding logic. Here, we show each instruction from instructions 228 ($228^1$, $228^{11}$ and $228^{111}$), being issued to a particular function unit pipeline (240, 242 and 244, respectively).

While the compiler 200 itself may be more complex and slower than a traditional compiler, critical runtime processing can be minimized, which can speed application performance. As well, the amount of decoding logic in the microprocessor 232 can be reduced.

Preferably, template restrictions and dispersal rules defined by the microprocessor architecture are accounted for in the template assignments for the FU-FSA 210. Accounting for the dispersal rules and template restrictions will allow for an even faster state transition.

We note that the dispersal rules will vary for different microprocessor architectures. Accordingly, it is common that guidelines for the dispersal rules are published by the microprocessor designer in publicly available documents for software developers. It is within the reach of one of skill in the art, having access to a published guideline of the dispersal rules or a detailed understanding of the function units of a particular microprocessor architecture, to account for the dispersal rules when enumerating valid template assignments for a particular microprocessor. An example of one such publication of dispersal rules is the "Intel Itanium (™) Processor Microarchitecture Reference for Software Optimization", Order Number 245473-001, March 2000, available from Intel Corporation.

Compiler Architecture

Figure 3:
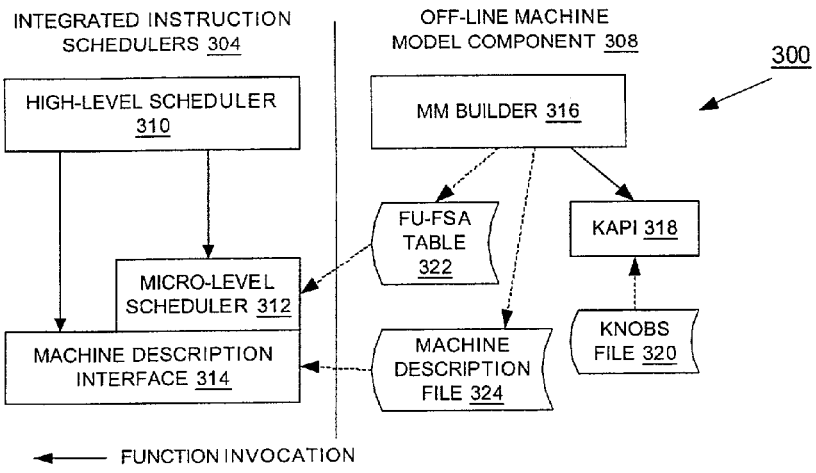
FIG. 3 depicts an overview of a compiler employing function unit based finite state automata.

FIG. 3 depicts an embodiment of the compiler 300 with integrated instruction scheduling and resource management. We differentiate, for explanatory purposes, between the integrated schedulers 304 and some of the off-line machine model components 308. This is primarily because the two components operate, on a functional level, independently, although certain data structures from the machine model component 308 are used during operation of the integrated schedulers 304. In a typical environment, the machine model builder 316 is used to construct the data files shown below it but does not have to be part of the final embodiment of the compiler 300. Further note, concerning FIG. 3, that function invocation and data paths are shown by solid and dashed lines, respectively, between the elements.

The integrated schedulers 304 include a high-level scheduler 310, a micro-level scheduler 312, and a machine description interface 314.

As was described above, the high-level scheduler 310 is primarily concerned with determining the issue cycle of each instruction destined for the microprocessor's function units. Instruction level parallelism can be applied by the high-level scheduler, as well as various transformations, such as data speculation, setting the scheduling priority of instructions, and deciding when (that is, in which cycle) certain instructions should be scheduled.

Complementing the high-level scheduler 310 is the micro-level scheduler 312. The micro-level scheduler 312 manages placement of instructions and resource management within a cycle. The micro-level scheduler 312, for an EPIC ("explicitly parallel instruction semantics") system, can also consider instruction templates and dispersal rules as part of its resource management tasks.

In normal operation, the high-level scheduler 310 operates first on one or more instructions, followed by the micro-level scheduler 312—so the function invocation is from the high-level scheduler 310 to the micro-level scheduler 312. (By this we mean that the two schedulers switch off at the instruction level—neither scheduler will necessarily be finished with all of the instructions when the other is invoked.) To access certain resource files from the off-line machine model component 308, a machine description interface 314 is included that provides hooks into the resource files, including the machine description file 324 (which is described in further detail below). The micro-level scheduler 312 can access the FU-FSA table 322 without the machine description interface 314.

Turning to the off-line machine model component 308, the machine modeling builder 316 is in charge of setting up data files that are used to manage critical resources of the microprocessor while the instructions are being scheduled.

The machine modeling builder 316 constructs a finite state automaton and other structures that model not only the microprocessor's function units, but also the instruction templates, dispersal rules, and execution latency.

The machine model builder 316 invokes certain functions through the knobs application programmers interface ("KAPI") 318, which provides a link into a knobs file 320. The knobs file 320 is a file that describes the architecture and micro-architecture details of a particular processor. The knobs file 320 can be published by the microprocessor designer or manufacturer—so it is subject to change as the microprocessor changes through revisions or as performance issues are addressed.

Using the KAPI 318 and knobs file 320, the machine builder module 316 is configured to construct the FU-FSA 322, as well as the machine description file 324. The FU-FSA 322 and its construction are described in further detailed below with reference to FIGS. 7A–B.

An advantage of the off-line machine model component 308 is that when the compiler is built, the machine model builder 316 can be run and the associated FU-FSA table 322 and the machine description file 324 can be included in the build—so, again the machine model builder 316, or for that matter the KAPI 318 and knobs file 320 do not need to be included in the final compiler. However, in another embodiment, they can be included, or they can be separately run from another machine, so that updated FU-FSA tables 322 and machine description files 324 can be plugged into the integrated instruction schedulers 304 at any time.

Figure 4:
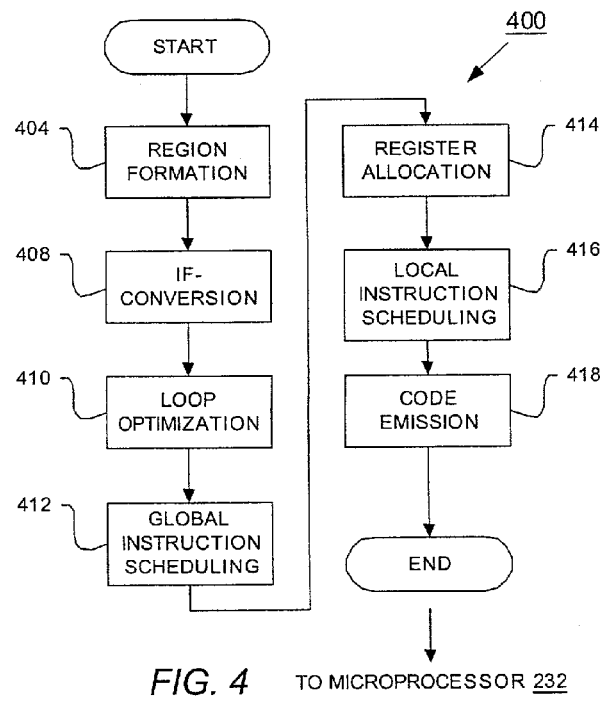
FIG. 4 is a flowchart of an improved compiler operation.

FIG. 4 is a flowchart depicting the major code generation phases 400 of our integrated instruction schedulers. The flowchart depicts generalized characteristics of acceptable compilers which are state of the art.

In one implementation of our inventions, we added systems and methods described herein to open source code of a commercially available compiler to couple the scheduling resource management capability, and particularly the function unit based finite state automata techniques. As is shown in FIG. 4, the redesigned compiler includes a region formation phase 404, an if-conversion phase 408, a loop optimization phase 410, a global instruction scheduling phase 412, a register allocation phase 414, a local instruction scheduling phase 416, and a code emission phase 418.

More particularly, the if-conversion phase 408 converts control flow into predicated code. The loop optimization phase 410 performs loop unrolling and software pipelining. The global instruction scheduling phase 412 reorders instructions across basic blocks. In the event of a spill from the register allocation phase 414, the local instruction scheduling phase 416 is invoked for the affected basic blocks.

We note that most of the phases are operating on single-entry-multiple-exit regions. For instance, the global instruction scheduling phase 412 operates on the scope of single-entry-multiple-exit regions containing multiple basic blocks with internal control flow transfers, the implementation being a forward cycle scheduling. Further, the global instruction scheduling phase 412 can drive control and data speculation to move load instructions across branches and aliasing store instructions. The local instruction scheduling phase 416, however, operates on a basic block scope without speculation, although both the global and local instruction scheduling phases incorporate resource management.

According to one embodiment, the integrated instruction schedulers can be built over the Pro64 (™) open source compiler available from Silicon Graphics, Inc., which is based in Mountain View, Calif. Other commercially available compilers can also be the foundation with which our inventions can be integrated or used, such compilers being available from, for example, Intel Corporation, and Microsoft Corporation, based in Redmond, Wash.

Exemplary pseudo code in TABLE 3 demonstrates the interaction between the high-level instruction scheduler and the micro-level instruction scheduler in a region-based instruction scheduler. The code begins by construction of a regional dependence graph (DAG). Then, it computes the earliest and latest issue time of each instruction based on the DAG. Next, it schedules each of the basic blocks according to their topological order with consideration of their respective frequency. For each basic block to be scheduled, the instruction scheduler first determines its source basic blocks—that is, the basic blocks from which we choose candidate instructions. From the source basic blocks, the scheduler constructs a list of ready instructions—namely, those whose predecessors in the DAG have already been scheduled. The remaining flow can be traced in the description below, and pseudo code found in TABLES 4, and 5.

TABLE 3

```
ScheduleRegion(region) {
    BuildDAG(region);
    Compute the earliest and latest issue time;
    region_bbs = SortRegionBBs(region);
    FOREACH basic block bb in region_bbs DO {
        source_bbs = FindSourceBBs(bb);
        candidate_ops = FindCandidateOps(source_bbs);
        WHILE (!candidate_ops->empty( )) {
            IF (CycleFull( ) || AllCandidatesTried( )) {
                AdvanceCycle( );
            }
            candidate = SelectOPforSchedule(candidate_ops);
            IF (IssueOp(candidate) == FAIL) {
                candidate->MarkAsTried( );
            } ELSE {
                CommitSchedule(candidate);
            }
        }
        EndBB( );
    }
}
```

Integrated Scheduling with Resource Management

Figure 5:
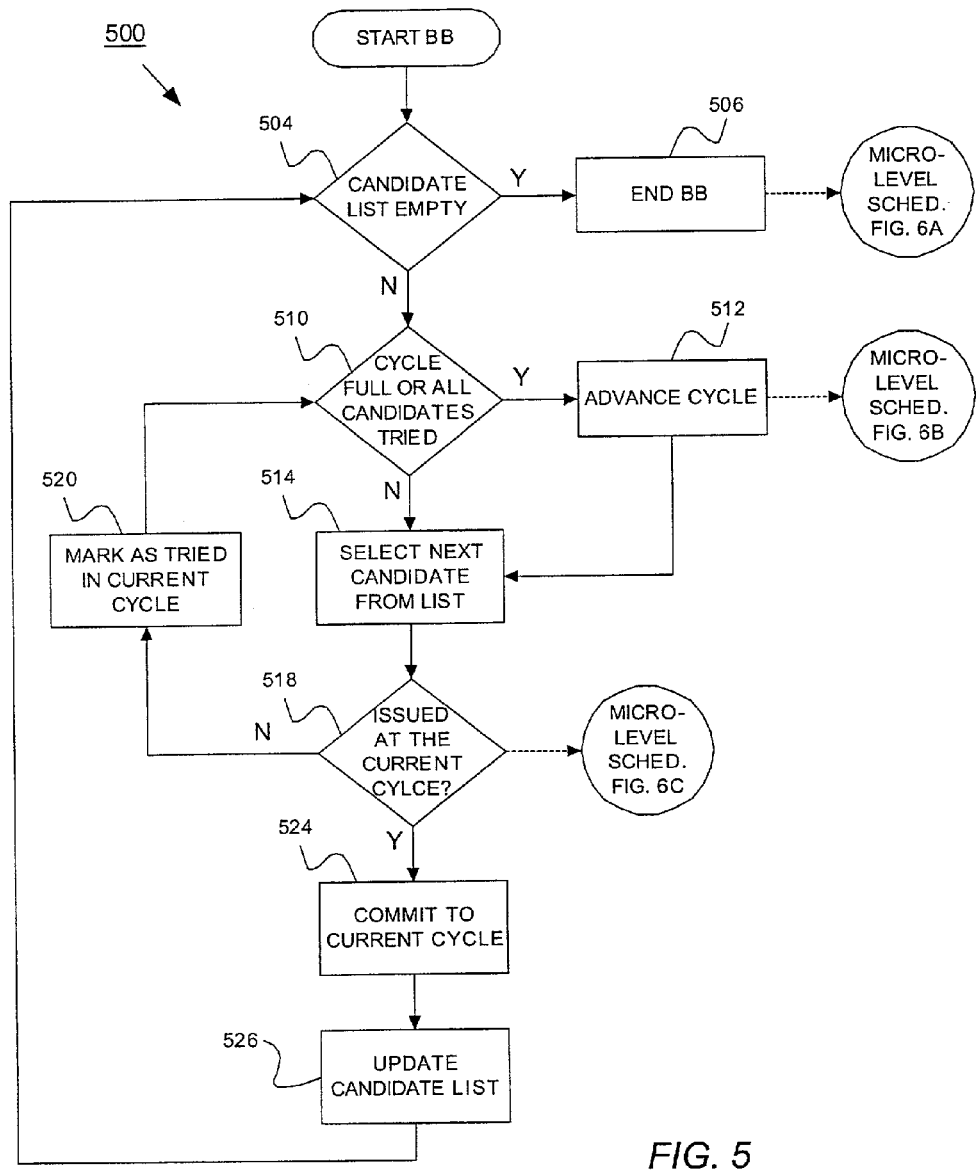
FIG. 5 is a flowchart depicting a high-level instruction scheduler process.
Figure 6A:
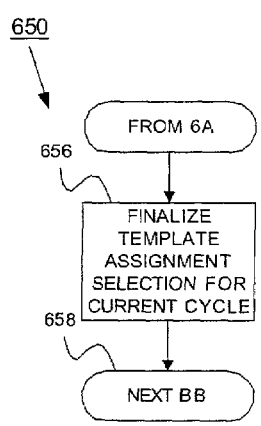
FIGS. 6A–C are flow charts depicting micro-level instruction scheduler processes.
Figure 6B:
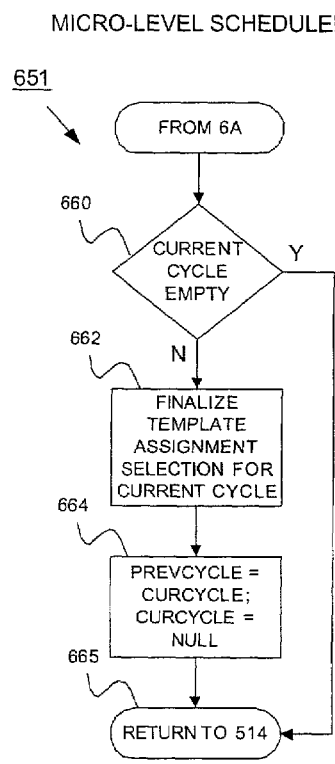
Figure 6C:
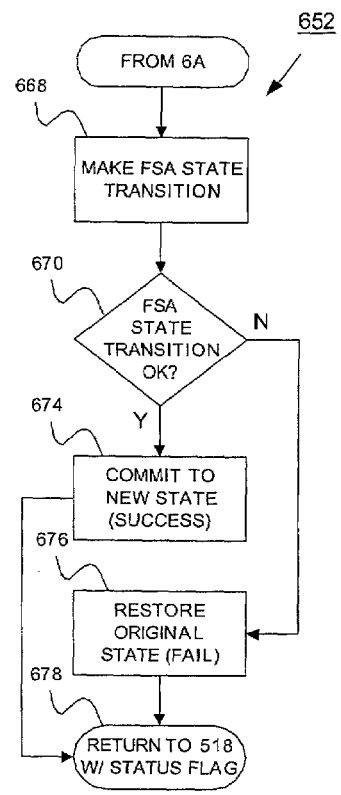

FIGS. 5, and 6A–C are flowcharts depicting the integration of the high-level and micro-level schedulers with resource management. High-level processes 500 are shown in FIG. 5, while micro-level processes 650, 651, and 652 are shown in FIGS. 6A–C.

In FIG. 5, we begin at act 504 by determining whether there are any instructions ready for scheduling. According to one embodiment, we test the candidate list 220 for this information. If the candidate list 220 is empty, then we continue to act 506, where the high-level scheduler invokes the micro-level scheduler to finalize template assignment for the current cycle. The corresponding micro-level process 650 is depicted in FIG. 6A as act 656. Scheduling is complete if there are no candidate instructions in the instruction list, so the process can exit in act 658—returning from both the micro-and high-level schedulers.

If the candidate list 220 is not empty, then in act 510 the high-level scheduler determines whether the current cycle is full, or if all the received instructions (e.g. all candidate instructions in the instruction list 220) have been tried. If either is true, then the process continues to act 512, where the high-level scheduler advances to the next cycle. However, as part of the process of advancing to the next cycle, the high-level scheduler invokes the micro-level scheduler—in particular the micro-level process 651 depicted in FIG. 6B.

Turning briefly to FIG. 6B, in act 660, the micro-level scheduler determines whether the current cycle is empty. If the current cycle is empty, then the micro-level scheduler returns to the high level scheduler in act 665 and processing continues to act 514. However, if the current cycle is not empty, then in act 662, the micro-level scheduler finalizes template assignment selection for the current cycle. In a multi-buffer embodiment, where we keep a one or more cycle delay before finalizing template assignments, in act 664 the previous cycle buffer is finalized and then set to the current cycle, and the current cycle buffer is flushed (or set to a null). After act 664, the micro-level level scheduler returns (in act 665) to the high-level scheduler.

Returning to the high-level scheduler in FIG. 5, the process then selects a next candidate from the candidate list in act 514. In act 518, the process determines whether the next candidate can be issued at the current cycle. Again, this involves invocation of the micro-level scheduler, but now micro-level process 652 shown in FIG. 6C.

Turning to FIG. 6C, in act 668 the process selects an available function unit for the candidate instruction to make the state transition. In act 670, the process tests the selected state transition, by consulting the FU-FSA, to verify whether the selected state transition (i.e., the arrangement of instructions for the function units) is a legal state transition in the FU-FSA.

Whether the state transition is legal will depend on whether a template exists in the FU-FSA that satisfies the dependence constraints for all instructions currently scheduled in the cycle. It is preferred that the dispersal rules of the particular microprocessor have been factored into construction of the FU-FSA, although this is not required since this checking can be performed on-the-fly. The knobs file 324, the machine description file 320, or another file can store the dispersal information (e.g., dispersal information can include rules for each of the slots, such as "if the slot is an F slot in the first bundle, then the slot disperses to F0" and "if the slot is an F slot in the second bundle, then the slot disperses to F1").

If the FU-FSA based state transition is okay, then processing continues to act 674 where the new state is finalized and a success flag is set for the state. However, if the FU-FSA based state transition is not okay, then processing continues to act 676, where the original state is restored a failure flag is set for the state. Either way, the process returns to the high-level scheduler at act 678 with the status flag.

If the instruction cannot be issued at the current cycle, then processing continues to act 520, where the high-level scheduler marks the instruction as tried in the current cycle and then continues to act 510. However, if the instruction can be issued at the current cycle, then processing continues to act 524, where the instruction is committed to the current cycle. Next, in act 526, the candidate list is updated to reflect the committed instruction's absence and processing continues to act 504.

Pseudo code for issuing the operation is shown in TABLES 4, and 5. The functions are typically part of the micro-level scheduler. In particular, TABLE 4 concerns the IssueOp function, while TABLE 5 concerns the MakeFSAStateTransition function, and further concerns a function for permuting the FU assignments. The pseudo code is best understood as augmenting FIG. 6C. (We note that "ta" stands for "template assignment", and "op" stands for "operation/instruction" in the pseudo code. These and other variable's representations will be clear upon review of the tables with the accompanying textual description.)

TABLE 4

```
IssueOp(inst) {
    IF (curCycle.Full( )) RETURN FAIL;
    Copy curCycle to tempCycle;
    IF (MakeFSAStateTransition(inst, tempCycle)) {
        Copy tempCycle to curCycle;
        RETURN SUCCESS;
    } ELSE
        RETURN FAIL;
}
```

TABLE 5

```
MakeFSAStateTransition(op, cycle) {
    //try available FUs
    func_unit = all FUs that op can be issued to;
    free_unit = all unoccupied FUs in cycle;
    candidate_unit = func_unit & free_unit;
    FOREACH FU in candidate_unit DO {
        Record op issued to FU in cycle;
        state = cycle->FU_state; // new state
        IF (FSA[state] is valid) {
            IF (intra-cycle dependence in cycle) {
                FOREACH ta in FSA[state].grps DO {
                    IF (ChkCycleDep(cycle, ta) == TRUE)
                        RETURN TRUE; // success
                }
            }
            ELSE {
                RETURN TRUE;
            }
        }
        Back out op from FU in cycle;
    }
    //try permuting assignments
    candidate_unit = func_unit & ~free_unit;
    FOREACH FU in candidate_unit DO {
        IF (FU is locked) CONTTNUE;
        old_op = cycle->op_in_FU(FU);
        Back out old_op from FU in cycle;
        Issue and lock op to FU in cycle;
        IF (MakeFSAStateTransition(old_op, cycle) == TRUE)
            RETURN TRUE;
        Back out op from FU in cycle;
        Record old_op issued to FU in cycle;
    }
    RETURN EALSE;
}
```

Function Unit Based Finite State Automata Data Structures, Transitions, and Methods for making the same Above we described processes and systems for coupled instruction scheduling and resource management. These techniques were referenced with respect to a function unit based finite state automata data structure, which can be of virtually any design. Now, however, we turn to presently preferred techniques for constructing computer readable function unit based finite state automata data structures, the structure itself, and aspects of state transitions within the structures.

In past systems, the approach to scheduling and resource management was a "de-coupled" approach, meaning that scheduling and resource management were completely separate processes. In some systems, scheduling was first performed by the compiler, then template selection and instruction bundling were performed in a completely separate process in the compiler. In other systems, scheduling was first performed by the compiler, then resource management was performed by the microprocessor.

While the literature discussed above does reference finite state automata, and existing systems do implement finite state automata methodologies, the approach often taken to the problem is from a template-centric methodology. As can be surmised, the number of states for the prior approaches grows significantly with each change in microprocessor architecture—often necessitating millions of states in the FSA table(s). As the number of states grow, so do the memory requirements for the compiler and the processing time to analyze the millions of states. Such a system is simply not scalable, especially as the processor width increases and parallelism needs to be exploited from one generation or version of microprocessors to the next.

For instance, for the Intel Itanium (™) architecture, which can issue two bundles per cycle, the upper bounds on a template-centric FSA table is the power set of all template assignments that have up to two bundles, or $2^{t(1+t)}$ states, where t is the number of legal templates per bundle, or $2^{156}$ possible states for a 12 template per bundle system. If we eliminate from this number invalid template assignments, we can reduce the number of states to $2^{68}$. However, even with aggressive trimming, such a template-based FSA still needs hundreds of thousands of states.

We couple instruction scheduling and resource management in our compiler. More particularly, we incorporate template restrictions and dispersal rules as part of resource management. At the core of our coupled approach is the function-unit (or "issue-port") based finite state automata data structure.

According to one embodiment, what we do is create a function unit (FU) vector, wherein each bit in the FU vector corresponds to a particular function unit (issue port). Where we have more than one function unit of a particular type, we still create a bit in the FU vector for each (so if we have two F-units, we still have two bits representing them in our FU vector). So, for example the Intel Itanium Architecture (™) has four basic function unit types, but nine actual function units (2 M-units, 2 I-units, 2 F-units, and 3 B-units). Each of the actual function units will have a bit in our FU vector, which results a nine-bit FU vector for the Itanium (™) implementation.

The arrangement of the bits in the FU vector is insignificant, although the FU vector could be arranged in a particular logical order that might speed identification of template assignments. A significant achievement is that we can completely represent our FU-FSA in less than $2^n$ states, where n is the number of function units (so less than 512 states for the first generation IPF).

We show two primary components in our FU-FSA, FU vectors and their corresponding FU template assignments. The FU template assignments are derived from original template assignments that are pre-built for a particular microprocessor, but the FU template assignments account for dispersal rules and template restrictions corresponding to any particular microprocessor. Thus, it is the case that there will be more original template assignments than FU template assignments after the dispersal rules have been enforced. Further, according to one embodiment, the FU template assignments are arranged, for each corresponding FU vector, into groups, the groups being sorted according to priority criteria.

Figure 7A:
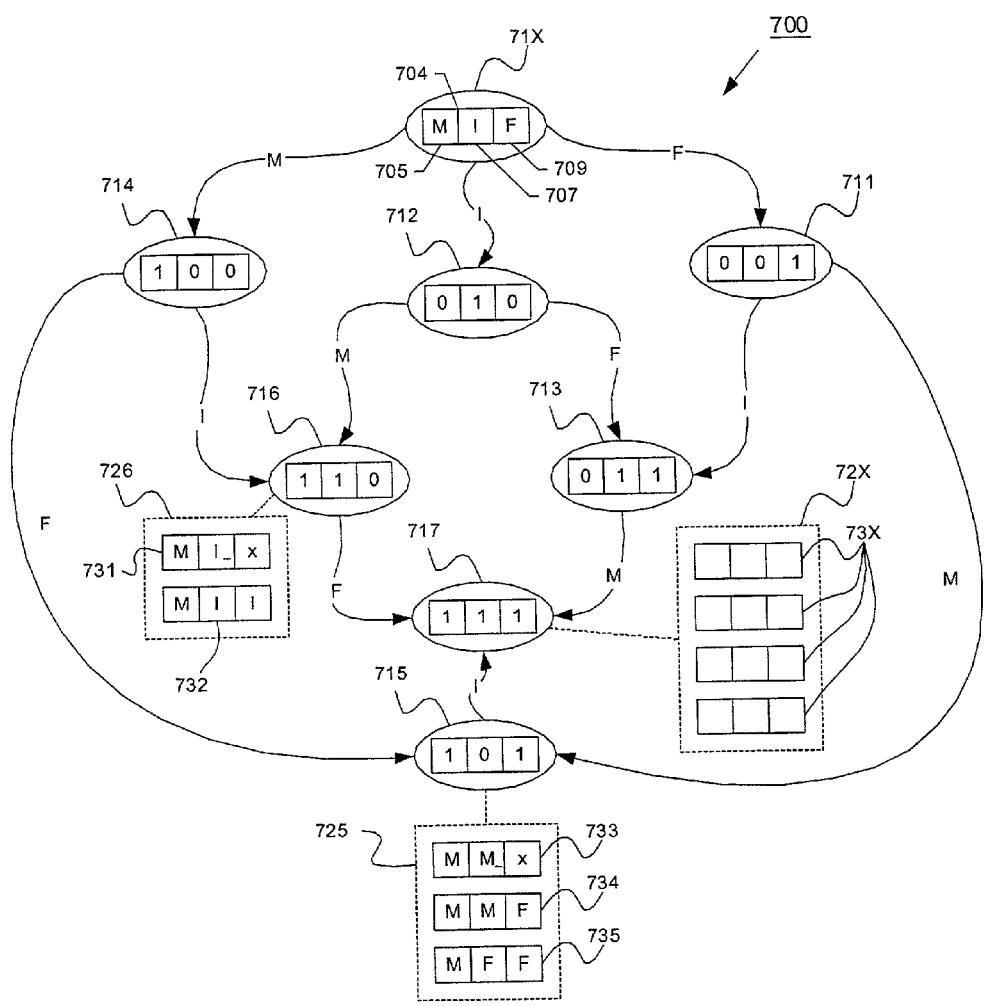
FIG. 7A is a diagram of a function unit based finite state automata data structure.

As is depicted in FIG. 7A, the FU-FSA 700 can be represented as a state machine. According to one embodiment, a FU-FSA state is a FU vector 71X representing the function units (issue ports) used (705, 707, 709) by the instructions scheduled into slots of a template assignment. Each state has a corresponding block 72X of legal FU template assignments 73X that can result from the particular FU vector 71X.

The transition from one state to the next is indicated by a path calling out the particular function unit bit that changed between any two states. According to one embodiment, as each instruction is placed into a buffer from the candidate list, the integrated schedulers keep track of the state. The micro-level instruction scheduler will analyze each instruction placement within a cycle to verify that a valid state does or could exist for the particular placement by determining whether there are any FU template assignments 73X representing the particular function unit(s) involved in the instruction(s). If there are no legal FU template assignments 73X for a particular ordering, then the ordering of instructions will not be permitted and a new ordering or even instructions must be tried. Further, if there are no legal FU template assignments 73X for a particular FU vector 71X, then the state itself can be removed from the data structure 700.

We note that as each instruction is examined, the particular state, when not all of the slots in a bundle are filled, can have a set of FU template assignments 73X that is the superset of FU vectors flowing from the current FU vector. For example, by this we mean that if the first instruction is an M instruction, then the current FU vector is 714. The remaining "bits" in the vector can be represented as "don't cares", meaning that valid FU vectors flowing from FU vector 714 include 715, 716 (which themselves can have supersets of FU template assignments based on combinations of "don't care" bits corresponding to the current state), and 717. Thus, the superset of FU template assignments of 714 can include the template assignment blocks 725, 726 and the template assignment block for FU vector 717). Using supersets of FU template assignments, it is possible to narrow down the set of instructions in the candidate list which are most likely to yield a valid FU template assignment.

The FU-FSA 700 is a computer readable data structure. It is arranged so that information stored in the structure can be easily retrieved by a microprocessor executing a compiler, such as the compiler described above. The FU-FSA 700 has a particular structure that imparts functionality to the microprocessor as the compiler is executed and the structure is read. It is based upon this structure and the anticipated information stored therein that the compiler is able to make FU-based FSA state transitions and assign each slot in one or more bundles (for an instruction cycle) to a particular function unit in the microprocessor. The result will be that the workload for the microprocessor resources executing a computer program compiled with the systems or techniques described herein will be optimized—i.e., they will exhibit a higher degree of parallelism than past compilers.

The data structures shown in FIG. 7A can be implemented in a number of different ways, such as run-time allocation of one or more blocks of memory that are communicatively coupled to the microprocessor executing the compiler, or in smaller discontiguous ranges of memory, such as might be the case with pointers and linked lists. Further, the structures can be pre-allocated in reserved memory areas, or hard-coded or wired through some form of persistent memory, such as read only memory (ROM), electrically erasable programmable read only memory (EEPROM), flash memory, or a gate array.

Returning to more specific elements of the FU-FSA 700, exemplary FU vector 704 comprises three bits, one bit for each function unit of a microprocessor. For instance, bit 705 corresponds to an M unit, bit 707 corresponds to an I unit, and bit 709 corresponds to an F unit. Although we describe only three function units, or three bits, the application of our data structure is scalable to any number of function units, and it is specifically applicable to the nine function unit IPF, as well as other parallel processor designs (superscalar, VLIW, etc.).

As instructions are queued in the compiler, they are extracted and matched to a particular function unit bit in a FU vector. In some instances, more than one instruction will match a single bit in the FU vector 704. This is acceptable and compensated for by the template assignment blocks 72X; it is precisely the reason the FU-FSA 700 can have a number of valid FU template assignments 73X for each completed FU vector 71X.

It is important to note that we show some exemplary FU template assignments 73X, but these are not necessarily actual, valid FU template assignments that have accounted for the dispersal rules (although they are in theory)—they are shown only for the purpose of illustration. The actual ordering or number of FU template assignments 73X corresponding to any particular FU vector 71X can vary depending on the template assignment and dispersal rules associated with any particular microprocessor architecture. Again, we mention that our FU vector preferably has no more used bits than there are issue ports for the microprocessor architecture. So, for example, we only show three bits in the FU vector 704, when in fact six bits (two Ms, two Is, and two Fs) are likely required for the FU template assignments depicted—as we show two valid M, F and I slots in some of our FU template assignments.

Again, there are two primary components of the FU-FSA 700. They include the enumerated FU vectors (711, 712, 713, 714, 715, 716, and 717) (we refer to the FU vectors collectively and generally as "FU vectors 71X"), and the FU template assignments (731, 732, 733, 734, 735, etc.—not all are called out in FIG. 7A) (we refer to the FU template assignments collectively and generally as "FU template assignments 73X"). Each of the FU template assignments 73X includes arrangements of template syllables (function unit combinations) that represent valid function unit usage patterns matching a particular FU vector 71X under the dispersal rules of the microprocessor.

According an aspect of our data structure, there can be many template assignments 73X corresponding to one FU vector 71X. Furthermore, one template assignment 73X can appear in the template assignment blocks 72X of multiple FU vectors 71X. Accordingly, in one embodiment, the FU template assignments are arranged in FU template assignment blocks (not all are shown but we do show 725, 726, and 72X) (we refer to the FU template assignment blocks collectively and generally as "template assignment blocks 72X"), each corresponding, respectively, to a particular FU vector 71X. Within each of the FU template assignment blocks 72X is a list of valid FU template assignments 73X, each matching the FU vector 71X for the FU template assignment block 72X.

Again, each completed FU vector 71X can have a plurality of FU template assignments 73X. All of these combinations are valid arrangements of function units for each slots in a cycle where the cycle can have up to N bundles on an N-bundle wide microprocessor. However, some valid arrangements include the use of one or more bundles with compressed templates. A compressed template is depicted in FIG. 7A as an underscore ("_") The underscore signals to the hardware that there is a stop bit between successive instructions in the bundle, meaning that the instructions in the slots before the stop bit are for a first cycle, while those in the slots after the stop bit are for a successive cycle.

By using stop bits, we can pack instructions from different cycles into earlier bundles for the purpose of smaller code size. The stop bit can be located between instructions in the bundle, or at the end of the instructions in the bundle. When placed at the end of the instructions, it signals that the next bundle should be forced into the next cycle. While not shown, where a stop bit is included in a FU template assignment 73X (e.g., 731 and 733), another instruction or function unit slot can flow in the bundle, such as an M, I, or F function unit slot—so the slot is not necessarily occupied by a NOP (we show the last slot with a lower case "x").

Constructing the Function Unit Based Finite State Automata

Figure 7B:
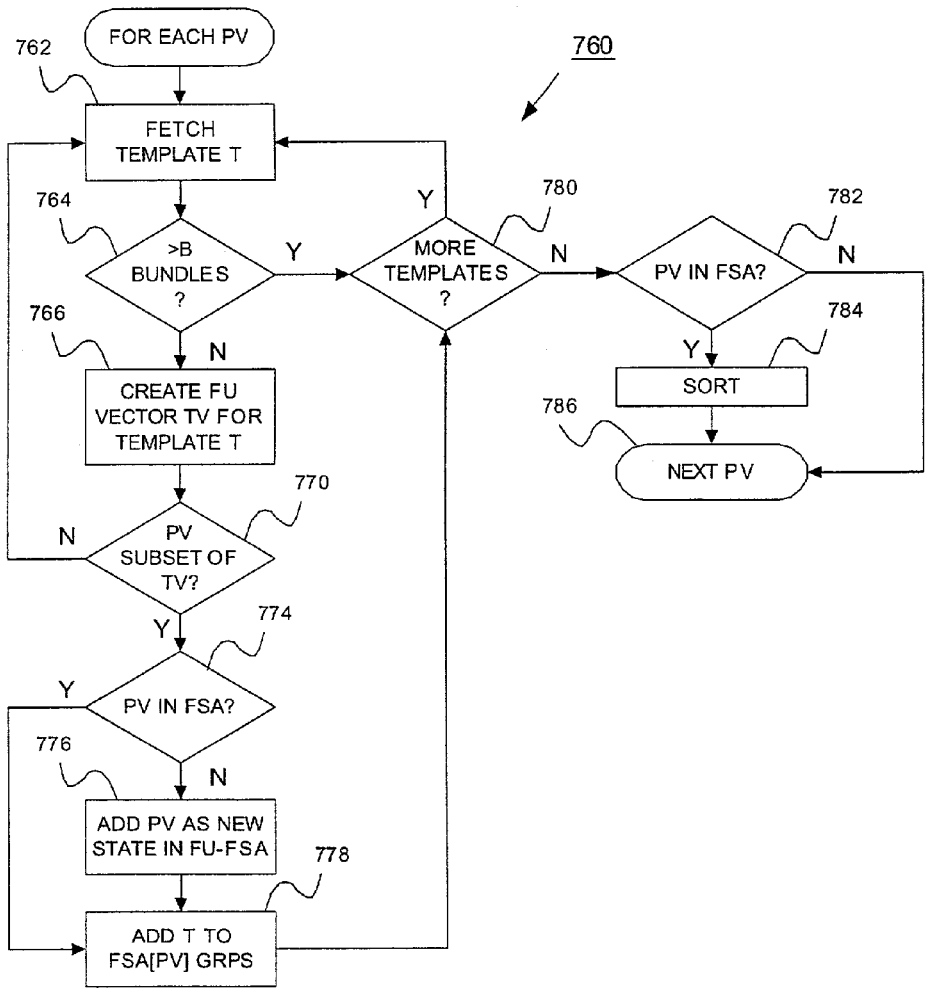
FIG. 7B is a flowchart depicting a method for constructing a function unit finite state automata data structure.

FIG. 7B is a flowchart depicting acts for constructing the FU-FSA. Exemplary pseudo code for achieving the same end is shown in TABLE 6. The acts are performed by a microprocessor executing instructions from a memory. Hark back to FIG. 3: the particular module in which these acts are performed is best represented by machine model builder 316. As this module is an off-line component, it can be part of or completely separate from the compiler. According to an embodiment, we account for the dispersal rules for any particular microprocessor prior to run-time of the integrated schedulers, that is, when the FU-FSA is constructed.

The process 760 embodied in the acts shown in FIG. 7B is typically performed in iterations—one for each FU usage vector, PV, to be built for the FU-FSA 700. For example, we can start by enumerating all of the possible FU usage vectors, and then examine the template assignments from an off-line file, for example the machine description file 324 or the knobs file 320, to find valid (or legal) FU template assignments for each FU usage vector PV.

A legal transition in the issue-port based FSA should consider not only the availability of function units (issue ports), but also the availability of template assignments to encode the occupied function units. The availability of template assignments for a given FU usage vector is determined by both the instruction dispersal rules and the available templates allowed by the architecture. While the dependence constraints among the instructions that occupy the slots in the issue ports are checked at the runtime of the compiler during state transition.

Dynamic enumeration of all template assignments of an issue-port state is expensive because it needs to be done frequently whenever an issue port is assigned to an instruction (or vice versa, depending on the point of view). This is one reason why it is preferable to associate a list of FU template assignments 73X, a template assignment block 72X, for each state prior to run time—that is, to create pre-built template assignments.

When we account for the template restrictions and/or dispersal rules in these template assignments, we do not need to dynamically enumerate the FU template assignments at run-time. Rather, we only need to scan the pre-built list of legal FU template assignments for the FU vector 71X for a FU template assignment within the block that satisfies the dependence constraints imposed by the current instructions in the cycle. For most cases, where no intra-cycle instruction dependence exists, even checking the dependence constraints can be skipped (we note that this is shown in the pseudo code in TABLE 5, above). This integrated issue port and template selection technique facilitates a small footprint and fast state transitions.

Typically, we are only concerned with the template assignments that will be no wider than the issue width of the microprocessor. So, for example, if the microprocessor can handle up to two bundles per cycle, then we are only concerned with template assignments with one or two bundles.

In act 762, a current (original) template assignment, T, is fetched and loaded into memory.

In act 764, a test is performed to determine whether the current template assignment has more than the maximum number of bundles, b, for a cycle (for example two bundles for a 6-wide microprocessor). If the template assignment has no more than the maximum number of bundles, then it is analyzed further, if not, it is ignored and processing continues to act 780, described below.

In act 766, a new FU vector, TV, is created per the dispersal rules. FU vector TV corresponds to the FU usage vector for the current template assignment T. Next, in act 770, a test is performed to determine whether the current iteration of FU usage vector PV is a subset of the FU vector TV. PV is said to be a subset of TV if when the bits of the two vectors are ORed together, there would be no more bits set (in the product) than there are in TV. If PV is a subset of TV, then original template assignment T can be a valid, legal FU template assignment for the FU-FSA state represented by the usage vector PV. If PV is not a subset of TV, then processing continues to act 762, otherwise processing continues to act 774. In act 774, a test is performed to determine whether PV is a usage vector in the FU-FSA 700.

If PV is not a usage vector in the FU-FSA 700, then PV is added as a FU vector 71X in act 776. If PV is a usage vector in the FU-FSA 700 (act 774), or after act 776, in act 778, template assignment T is added as a FU template assignment 73X in the corresponding template assignment block 72X for the FU vector 71X (corresponding to PV). From act 778, processing continues to act 780.

In act 780, a test is performed to determine whether there are more original template assignments to fetch. If there are more original template assignments to fetch, then processing continues to act 762. Otherwise, processing continues to act 782. In act 782 a test is performed to determine whether the PV is in the FU-FSA (this act is similar to act 774). If PV is in the FU-FSA, then processing continues to act 784. In act 784, the FU template assignments (now including original template assignment T) 73X, within the current template assignment block 72X are sorted. This act is optional and it is described in further detail below. Next, in act 786 (or if PV was not in the FU-FSA in act 782), the process continues to act 762, where it begins again for the next FU usage vector PV.

Returning to act 784, which is sorting: According to one embodiment, during template assignment it will typically be the case that the first FU template assignment in the template assignment block will be the FU template assignment that is selected for the cycle. However, we can further optimize the FU-FSA 700 by sorting the valid FU template assignments 73X within the template assignment blocks 72X. For instance, we can arrange the list of valid FU template assignments for the following priorities:

1) Smaller bundle count in a template assignment
2) Template assignments with compressed template assignments
3) Template assignment preference—e.g. template assignment heuristics Optimizations 1) and 2) favor the selection of short template assignments and template assignments that are compressed. This will reduce the code size of the scheduled instructions. A smaller code size generally leads to better performance due to a reduction, for instance in cache misses. Optimization 3) arranges the template groups according to some template priority as determined by heuristics. For example, it might be appreciated that one template arrangement (e.g. MFB) is objectively better than another (e.g., MFI) because the former may be useful in the introduction of branch prediction instructions in a later compiling phase.

TABLE 6

```
BuildFSA {
    FOREACH FU usage vector PV DO {
        FOREACH template assignment T with
            at most b bundles DO {
            TV = FU usage vector of T per dispersal rules;
            IF (PV is a subset of TV) {
                IF (PV is not in FSA) {
                    Add PV as a new FSA state;
                }
                Add T to FSA[PV].grps;
            }
        }
        IF (PV is in FSA) {
            Sort FSA[PV].grps according to
                priority criteria;
        }
    }
    Build FSA transition table;
}
```

EXAMPLES

Two examples are provided. First, we return to the source code in TABLE 1 and show the compiled source code that is emitted from our compiler with integrated scheduling and resource management. In our case, as we load instructions into our candidate list and match the instructions that can be reordered by the micro-scheduler with the FU vectors and template assignments in our FU-FSA, we avoid the extra cycle and nops shown in TABLE 2. Our solution is shown in TABLE 7:

TABLE 7

```
{mii:     ld a [x]
          add b = y, e
          add x = h, i ;;}
{mmi:     ld y = [f]
          ld c = [g]
          add d = j, k ;;}
```

Figure 8A:
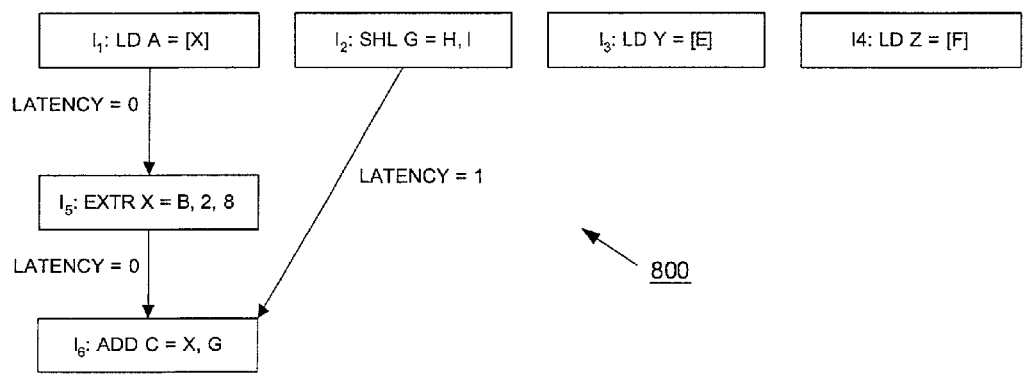
FIGS. 8A–B depict an example of integrated scheduling and resource management. In particular.
Figure 8B:
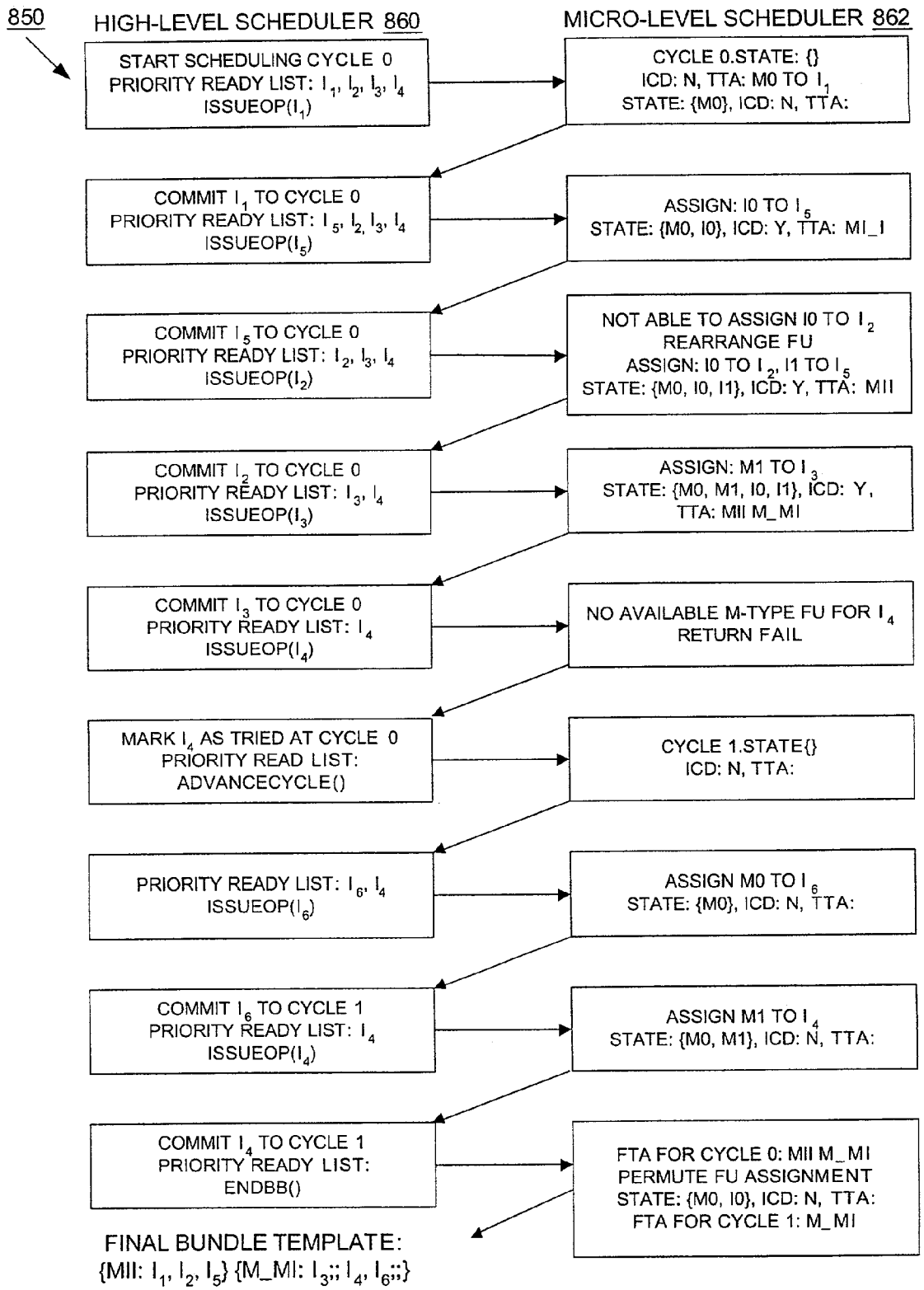

In FIGS. 8A and 8B, we show another example—this example for the nine function unit IPF described above. In particular FIG. 8A depicts a dependence DAG 800 with latencies for instructions fed into the compiler, while FIG. 8B traces through a typical integrated scheduling and resource management cycle 850 to output a final bundle template. On the left side of FIG. 8B, we show the high-level scheduling operations 860, while on the right side we show the micro-level scheduling operations 862. In FIG. 8B, tentative template assignments are denoted "TTA", intra-cycle dependencies are denoted "ICD", and final template assignment is denote "FTA". (Note the intra-cycle dependency for IssueOp($I_5$), between $I_1$ and $I_5$, from FIG. 8A. Further, note that the valid function units for the instructions shown in FIG. 8A are shown in TABLE 8. This information can be take from the knobs file or the machine description file.)

TABLE 8

| $I_1, I_3, I_4$: | M0, M1 |
| $I_2$: | I0 |
| $I_5$: | I0, I1 |
| $I_6$: | M0, M1, I0, I1 |

The modular design of our compiler, and in particular the instruction scheduler enables easy plug-in of a new instruction scheduler or machine model builder, as well a more scalable approach to compiler design—especially as the underlying characteristics of the microprocessor evolve. For instance, having a FU-FSA that can mature with advanced microprocessor designs, is a significant advancement in the art.

The above systems and techniques are described with reference to flowcharts and data flow diagrams, as well as various modular drawings. Some of these are intended to be exemplary of the best modes or embodiments of our inventions, but not the only embodiments of our inventions.

For example, the FU-FSA can have a number of different actual structures—what is important is that it represents function unit vector usage and contains corresponding template assignments for each. Further, we describe many of the techniques with respect to certain "processes" or "acts". These acts are computer implemented—meaning that these acts are typically embodied in computer program code stored in one or more memory locations or a computer readable medium that is configured to cause one or more microprocessors to perform the acts. Methods for causing a microprocessor to execute computer program code are well known and can be implemented on virtually any general purpose computer.

According to an embodiment, the computer implemented methods and data structures can be stored in one or more computer readable mediums directly linked, over a bus, for instance, to the local microprocessor (e.g., a hard disk, a volatile memory, a non-volatile memory, a CD-ROM, a floppy drive, a gate array, etc.). However, in other embodiments the methods can be downloaded in a computer readable format, or modulated over an RF carrier, from a remote computer over a network—such as the Internet—, and then executed from a memory communicatively coupled to the local microprocessor.

In a like manner, a local microprocessor executing an integrated scheduler and resource management compiler as we have described, can access a remote memory over a similar network to access the FU-FSA that we have described, or any of the other memory structures we describe (e.g., the knobs file, the machine model description, etc.).

In still other embodiments, a remote computer system for compiling computer instructions, is sent computer instructions from a local computer, and the remote computer system, employing the systems, methods, techniques or structures described above, compiles the instructions and returns them to the local computer or puts the compiled instructions in a location where the local computer has access to the compiled instructions.

What is claimed is:

1. A computer implemented system for instruction scheduling and resource management comprising:
    a scheduling module to order a sequence of instructions;
    a function unit based finite state automata table to store a plurality of function unit vectors, each function unit vector having information about usage of function units of a microprocessor, each function unit vector being associated with one or more function unit template assignments, each function unit template assignment representing a bundling of instructions associated with a predefined function unit usage pattern; and one or more microprocessor resource management components to match the sequence of instructions with at least one of the plurality of function unit vectors, and to arrange the sequence of instructions in accordance with at least one of the function unit template assignments corresponding to the at least one of the plurality of function unit vectors and in cooperation with the scheduling module.

2. The computer implemented system of claim 1, wherein the function unit template assignments are configured to account for dispersal rules and template restrictions corresponding to a particular microprocessor.

3. The computer implemented system of claim 1, further comprising:

a knobs file to store data describing a microprocessor architecture;

a machine description file to store microprocessor resource information including machine width, registers, function units, and template assignment information; and a machine modeling module to access the knobs file and the machine description file, and to construct the function unit based finite state automata table.

4. The computer implemented system of claim 3, wherein the machine description file is configured to be constructed by the machine modeling module based on the knobs file.

5. The computer implemented system of claim 3, wherein the machine modeling module and knobs file are configured to allow replacement of the knobs file.

6. The computer implemented system of claim 3, wherein the machine description file is further configured to store scheduling information including instruction latency, and pipeline bypass constraints.

7. The computer implemented system of claim 3, wherein the microprocessor resource management components include a machine description interface configured to access the machine description file.

8. The computer implemented system of claim 1, wherein the scheduling module includes a high-level instruction scheduler to determine an issue cycle for each instruction in the sequence of instructions, and a low-level instruction scheduler to determine placement of each instruction within the issue cycle.

9. The computer implemented system of claim 1, further comprising a plurality of buffers to store the arranged sequences of instructions.

10. The computer implemented system of claim 9, wherein the plurality of buffers is configured to store the arranged sequences of instructions for a plurality of cycles.

11. A computer implemented method for integrated instruction scheduling and resource management for a compiler, comprising:

scheduling a plurality of instructions into an issue cycle;

classifying each of the plurality of instructions by function unit usage;

matching the function unit usage for the plurality of instructions with a stored function unit vector;

identifying one or more stored function unit template assignments, that correspond to the function unit vector, the function unit template assignments accounting for dispersal rules, each function unit template assignment representing a bundling of instructions associated with a predefined function unit usage pattern; and arranging the plurality of instructions in accordance with one of the identified function unit template assignments.

12. The method of claim 11, further comprising:

examining dispersal rules for a particular microprocessor; and prior to identifying one or more stored function unit template assignments, building the function unit template assignments based on the dispersal rules.

13. The method of claim 11, further comprising:

receiving instructions into a candidate list, the instructions including the plurality of instructions;

before matching the function unit usage, loading the plurality of instructions into a temporary buffer;

after arranging the plurality of instructions, loading the plurality of instructions into a cycle buffer;

loading a second plurality of instructions from the candidate list into the temporary buffer;

repeating the classifying, matching, identifying and arranging for the second plurality of instructions;

finalizing the plurality of instructions in the cycle buffer; and loading the second plurality of instructions into the cycle buffer.

14. The method of claim 13, further comprising repeating the acts of repeating, finalizing, and loading after the act of finalizing, for a third plurality of instructions from the candidate list and the second plurality of instructions.

15. The method of claim 14, further comprising re-classifying at least one of the third plurality of instructions with a new function unit usage.

16. The method of claim 13, further comprising re-classifying at least one of the second plurality of instructions with a new function unit usage.

17. The method of claim 11, further comprising re-classifying at least one of the plurality of instructions with a new function unit usage.

18. The method of claim 17, further comprising repeating the matching, identifying, and arranging, after the re-classifying.

19. The method of claim 17, further comprising:

attempting to match the re-classified function unit usage for the plurality of instructions with a stored function unit vector; and restoring the first classified function unit usage, when the attempting to match is unsuccessful.

20. A computer readable medium having stored therein one or more sequences of instructions for causing one or more microprocessors to perform the acts for integrated instruction scheduling and resource management, the acts comprising:

scheduling a plurality of instructions into an issue cycle;

classifying each of the plurality of instructions by function unit usage;

matching the function unit usage for the plurality of instructions with a stored function unit vector;

identifying one or more stored function unit template assignments that correspond to the function unit vector, the function unit template assignments accounting for the dispersal rules, each function unit template assignment representing a bundling of instructions associated with a predefined function unit usage pattern; and arranging the plurality of instructions in accordance with one of the identified function unit template assignments.

21. The computer readable medium of claim 20, further comprising instructions for causing the acts of:
   examining dispersal rules for a particular microprocessor; and
   building the function unit template assignments based on the dispersal rules, prior to the act of identifying.

22. The computer readable medium of claim 20, further comprising instructions for causing the acts of:
   receiving instructions into a candidate list, the instructions including the plurality of instructions;
   loading the plurality of instructions into a temporary buffer, before the act of matching;
   loading the plurality of instructions into a cycle buffer, after the act of arranging;
   loading a second plurality of instructions from the candidate list into the temporary buffer;
   repeating the acts of classifying, matching, identifying and arranging for the second plurality of instructions;
   finalizing the plurality of instructions in the cycle buffer; and
   loading the second plurality of instructions into the cycle buffer, after the act of finalizing.

23. The computer readable medium of claim 22, further comprising instructions for causing the act of repeating the acts of repeating, finalizing, and loading after the act of finalizing, for a third plurality of instructions from the candidate list and the second plurality of instructions.

24. The computer readable medium of claim 23, further comprising instructions for causing the act of re-classifying at least one of the third plurality of instructions with a new function unit usage.

25. The computer readable medium of claim 22, further comprising instructions for causing the act of re-classifying at least one of the second plurality of instructions with a new function unit usage.

26. The computer readable medium of claim 20, further comprising instructions for causing the act of re-classifying at least one of the plurality of instructions with a new function unit usage.

27. The computer readable medium of claim 26, further comprising instructions for causing the acts of repeating the acts of matching, identifying, and arranging, after the act of re-classifying.

28. The computer readable medium of claim 26, further comprising instructions for causing the acts of:
   attempting to match the re-classified function unit usage for the plurality of instructions with a stored function unit vector; and
   restoring the first classified function unit usage when the act of attempting to match is unsuccessful.

29. The computer implemented system of claim 1 in which each function unit vector comprises bits, each bit corresponding to a function unit of the microprocessor.

* * * * *